(12) United States Patent
Barnes

(10) Patent No.: US 11,137,336 B2
(45) Date of Patent: Oct. 5, 2021

(54) INTEGRATED FLOW CYTOMETER MODULE AND LIQUID HANDLING SYSTEM AND METHODS FOR USE

(71) Applicant: Essen Instruments, Inc., Ann Arbor, MI (US)

(72) Inventor: Stephen Barnes, Albuquerque, NM (US)

(73) Assignee: Essen Instruments, Inc., Ann Arbor, MI (US)

( * ) Notice: Subject to any disclaimer, the term of this patent is extended or adjusted under 35 U.S.C. 154(b) by 178 days.

(21) Appl. No.: 16/175,963

(22) Filed: Oct. 31, 2018

(65) Prior Publication Data

US 2020/0132587 A1 Apr. 30, 2020

(51) Int. Cl.
*G01N 15/00* (2006.01)
*G01N 15/14* (2006.01)
*G01N 1/14* (2006.01)

(52) U.S. Cl.
CPC .......... *G01N 15/1404* (2013.01); *G01N 1/14* (2013.01); *G01N 15/1425* (2013.01); *G01N 2001/1427* (2013.01); *G01N 2015/1409* (2013.01)

(58) Field of Classification Search
CPC ................. G01N 15/1404; G01N 2015/1409
See application file for complete search history.

(56) References Cited

U.S. PATENT DOCUMENTS

| | | | |
|---|---|---|---|
| 8,628,723 B2 | 1/2014 | Vandergaw | |
| 2002/0192113 A1* | 12/2002 | Uffenheimer | G01N 15/1404 422/67 |
| 2005/0249635 A1 | 11/2005 | Okun | |
| 2006/0281143 A1* | 12/2006 | Liu | C12M 23/34 435/34 |
| 2009/0051912 A1* | 2/2009 | Salazar | G01N 15/1484 356/246 |
| 2011/0284378 A1* | 11/2011 | Shinoda | G01N 27/44791 204/603 |
| 2016/0377524 A1* | 12/2016 | Martin | G01N 35/1097 73/864.81 |

* cited by examiner

*Primary Examiner* — Rebecca C Bryant
(74) *Attorney, Agent, or Firm* — McDonnell Boehnen Hulbert & Berghoff LLP

(57) ABSTRACT

A flow cytometer module configured to be integrated with a liquid handling system is provided herein. The flow cytometer module includes (a) a flow cell, (b) a first fluidic pathway, (c) an inlet configured to receive a sample introduction device of the liquid handling system including one or more samples, (d) a second fluidic pathway in fluid communication with the first fluidic pathway, (e) a laser interrogation device configured to examine the one or more samples at a laser interrogation point in the second fluidic pathway, and (f) a controller in communication with the liquid handling system and configured to cause the flow cytometer module to perform functions comprising: (i) recording data from the laser interrogation device corresponding to a plurality of events as the one or more samples pass the laser interrogation point, and (ii) transmitting the data corresponding to the plurality of events to the liquid handling system.

26 Claims, 7 Drawing Sheets

INTEGRATED FLOW CYTOMETER MODULE AND LIQUID HANDLING SYSTEM AND METHODS FOR USE

BACKGROUND

Flow cytometry is a technology employed in cell counting, cell sorting, biomarker detection and protein engineering, for example, conducted by suspending cells in a stream of fluid and passing them by an electronic detection apparatus. Flow cytometry allows simultaneous multiparametric analysis of the physical and/or chemical characteristics of up to thousands of particles per second. Traditionally, flow cytometers are standalone instruments designed to measure biological samples which are in aqueous suspensions contained in assay plates or vials, and may be capable of actively separating and isolating particles that have properties of interest. As such, they are typically independent lab instruments. An operator (or robotic device) presents the sample(s) to the cytometer, the cytometer performs its measurements, and the cytometer reports the results to the operator.

Traditional liquid handling systems are focused on automatic plate preparation and do not include flow cytometry capabilities. Liquid handling systems mix reagents, prepare titrations, and fill plates which are then taken to other systems for incubation, sealing, reading, among other actions. Liquid handling systems also have the capability to dispense, aspirate, and move liquids around on deck, and they can measure and control temperature, mixing, pH, and dissolved oxygen. However, traditional liquid handling systems cannot measure the cells themselves. Instead, samples must be removed from the liquid handling system to a separate flow cytometer for further analysis. As such, it may be beneficial to have a flow cytometer module that is configured to be integrated with a liquid handling system to enable measurement of viability, apoptosis, and proliferation in near real-time.

SUMMARY

In a first aspect, the present disclosure provides a flow cytometer module configured to be integrated with a liquid handling system. The flow cytometer module comprises: (a) a flow cell having a first end and a second end opposite the first end, (b) a first fluidic pathway having a first end and a second end, (c) an inlet positioned at the first end of the flow cell, wherein the inlet is configured to receive a sample introduction device of the liquid handling system including one or more samples, (d) a second fluidic pathway having a first end and a second end, wherein the first end of the second fluidic pathway is in fluid communication with the second end of the first fluidic pathway, and wherein the second end of the second fluidic pathway is positioned at the second end of the flow cell, (e) a laser interrogation device configured to examine the one or more samples at a laser interrogation point in the second fluidic pathway, and (f) a controller configured to be in communication with the liquid handling system, wherein the controller comprises non-transitory computer-readable medium having stored thereon instructions that, when executed by one or more processors, cause the flow cytometer module to perform functions comprising: (i) recording data from the laser interrogation device corresponding to a plurality of events as the one or more samples pass the laser interrogation point, and (ii) transmitting the data corresponding to the plurality of events to the liquid handling system.

In a second aspect, the present disclosure provides a system for transferring one or more samples from a liquid handling system to a flow cytometer module. The system comprises: (a) the flow cytometer module of the first aspect, and (b) a liquid handling system comprising: (i) one or more sample wells, and (ii) a sample introduction device configured to receive one or more samples from the one or more sample wells, wherein the flow cytometer module is removably coupled to the liquid handling system, and wherein the inlet of the flow cytometer module is configured to receive the sample introduction device to thereby transfer the one or more samples from the sample introduction device to the flow cytometer module.

In a third aspect, the present disclosure provides a method operable by a flow cytometer module. The method comprises: (a) removably coupling a flow cytometer module to a liquid handling system, the flow cytometer module comprising (i) a flow cell having a first end and a second end opposite the first end, (ii) a first fluidic pathway having a first end and a second end, (iii) an inlet positioned at the first end of the flow cell, (iv) a second fluidic pathway having a first end and a second end, wherein the first end of the second fluidic pathway is in fluid communication with the second end of the first fluidic pathway, and wherein the second end of the second fluidic pathway is positioned at the second end of the flow cell, (v) a laser interrogation device, and (vi) a controller configured to be in communication with a liquid handling system, wherein the controller comprises non-transitory computer-readable medium having stored thereon instructions that, when executed by one or more processors, cause the flow cytometer module to perform functions, (b) providing a fluid flow from the first end of the first fluidic pathway to the second end of the first fluidic pathway, and from the first end of the second fluidic pathway to the second end of the second fluidic pathway, (c) receiving, through the inlet of the flow cytometer module via a sample introduction device of the liquid handling system, one or more samples into the fluid flow at the first end of the second fluidic pathway, (d) recording, via the controller, data from the laser interrogation device corresponding to a plurality of events as the one or more samples pass a laser interrogation point, and (e) transmitting, via the controller, the data corresponding to the plurality of events to the liquid handling system.

The features, functions, and advantages that have been discussed can be achieved independently in various examples or may be combined in yet other examples, further details of which can be seen with reference to the following description and figures.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts were described in conjunction with specific examples, it will be understood that these examples are not intended to be limiting. All examples of any aspect of the invention can be used in combination, unless the context clearly dictates otherwise.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to". Words using the singular or plural number also include the plural and singular number, respectively.

Figure 1:
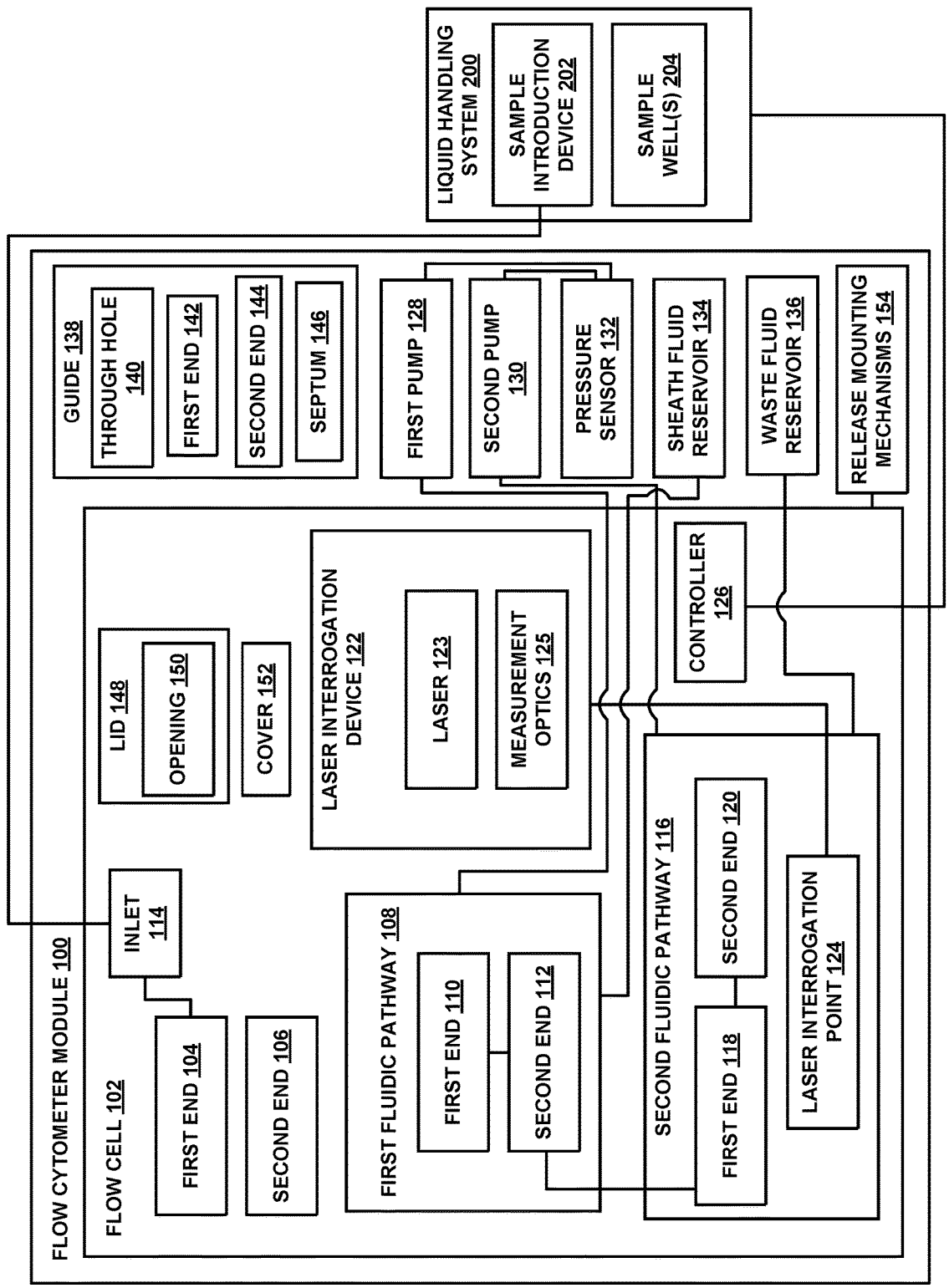
FIG. 1 is a block diagram of an example flow cytometer module.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 6:
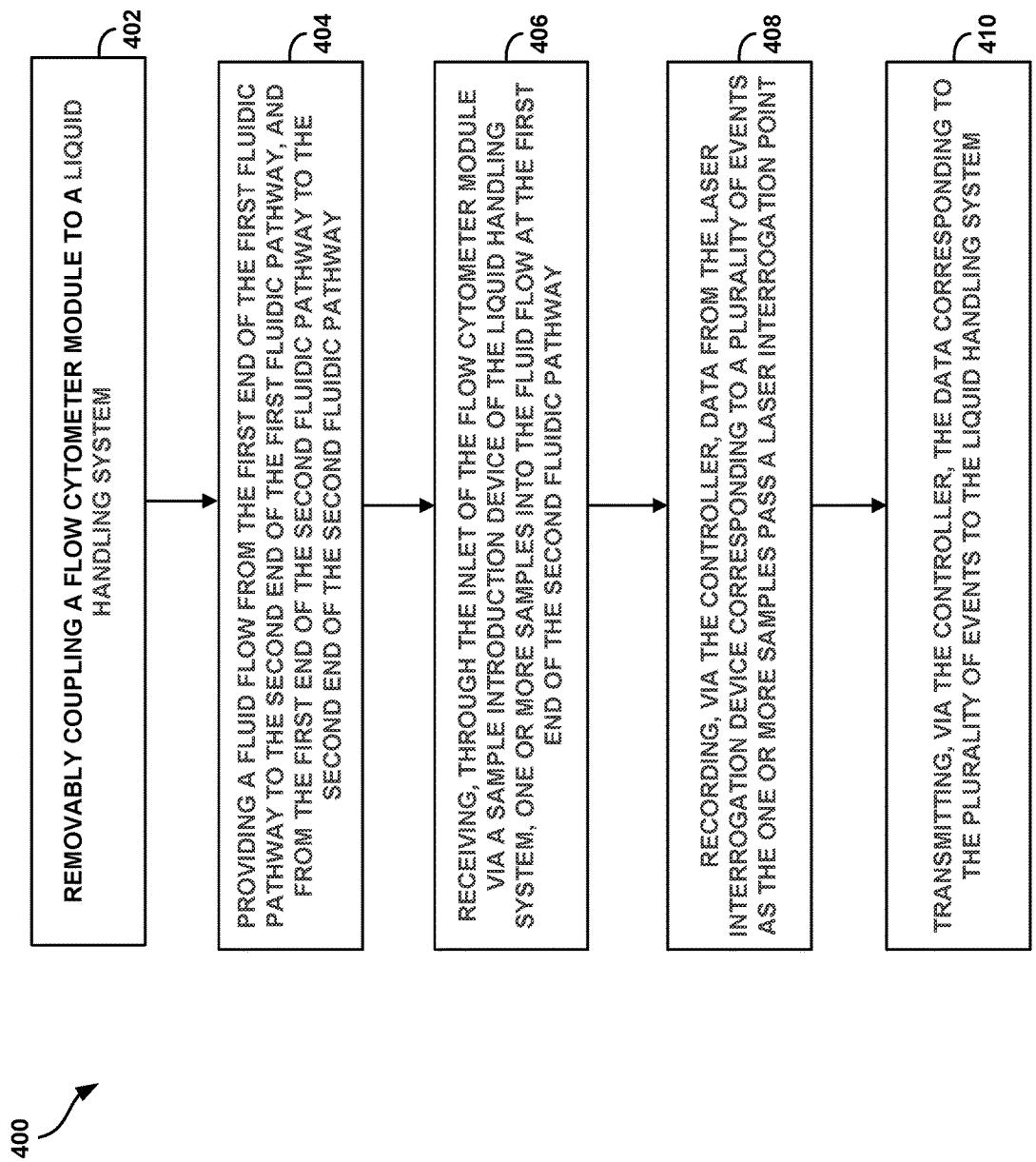
FIG. 6 is a flowchart of an example method operable by the flow cytometer module of any one of FIGS. 1-5.

In FIG. 6, the blocks may represent operations and/or portions thereof and lines connecting the various blocks do not imply any particular order or dependency of the operations or portions thereof. It will be understood that not all dependencies among the various disclosed operations are necessarily represented. FIG. 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

For the purposes of the present invention, the term "particles" as used herein refers to small objects with physical size between 1 nm and 1 mm including, but not limited to, molecules, cells, proteins, protein aggregates, microbes, virus, microspheres, microbeads, cellular components such as nuclei, mitochondrion, chemical compounds, and chemical aggregates, etc.

As used herein "sample" refers to any quantity of liquid which may contain particles of interest or marker particles that are detectable by a particle analyzer. More specifically a sample may include a fluid solution or suspension containing particles of interest or marker particles to be detected and/or analyzed using a method and/or apparatus disclosed herein. The particles of interest in a sample may be tagged, such as with a fluorescent tag. The particles of interest may also be bound to a bead, a receptor, or other useful protein or polypeptide, or may just be present as free particles, such as particles found naturally in a cell lysate, purified particles from a cell lysate, particles from a tissue culture, etc. The sample may include chemicals, either organic or inorganic, used to produce a reaction with the particles of interest. When the particles of interest are biomaterials, drugs may be added to the samples to cause a reaction or response in the biomaterial particles. The chemicals, drugs or other additives may be added to and mixed with the samples when the samples are in sample source wells or the chemicals, drugs or other additives may be added to the samples in the fluid flow stream after the samples have been uptaken by the autosampler.

For the purposes of the present invention, the term "well" as used herein may include any vessel for containing a sample, such as a chamber, dish, tube, bottle, vial, reservoir trough, or a well on a microtiter plate.

As used herein "microplate" and "plate" refer to a structure capable of holding one or more samples to be analyzed or aliquot of marker particles.

As used herein, the term "fluidic pathway" or "conduit" refers to device such as a tube, channel, etc. through which a fluid stream flows. A fluidic pathway may be composed of several separate devices, such as a number of connected or joined pieces of tubing or a single piece of tubing, alone or in combination with channels or other different devices.

The examples described herein provide a cytometer module which is designed to be integrated into another parent system. The parent system could be any biological cell processing or handling system which includes liquid handling and would be enhanced by including cytometric analysis. Adding a flow cytometer module to such a liquid handling system adds significant new capabilities to the liquid handler and essentially turns the liquid handler into automated lab bench, in particular for "mix and read" experiments. Such a liquid handler integrated with a flow cytometer module would have in-line quality control capabilities. The flow cytometer module could allow process monitoring capabilities, such as waiting until enough cells have entered a certain state before adding an additional reagent.

Integrating a flow cytometer with a liquid handler would seamlessly put two lab functions together where currently external robotics and additional complexity are required. As such, an integrated flow cytometer module would eliminate the extra steps of plating samples which must then presented to the flow cytometer by a robot or an operator. Instead, the samples can be moved directly from the source container in the liquid handler (e.g., vial, flask, tube, plate, micro bioreactor, etc.) to the flow cytometer for instant analysis. The integrated flow cytometer module is configured to receive the samples directly from the liquid handler via a sample introduction device controlled by the liquid handler, such as a pipette or a syringe.

Various other features of the example systems discussed above, as well as methods for using these systems, are also described hereinafter with reference to the accompanying figures. Illustrative, non-exhaustive examples, which may or may not be claimed, of the subject matter according the present disclosure are provided below.

Figure 2:
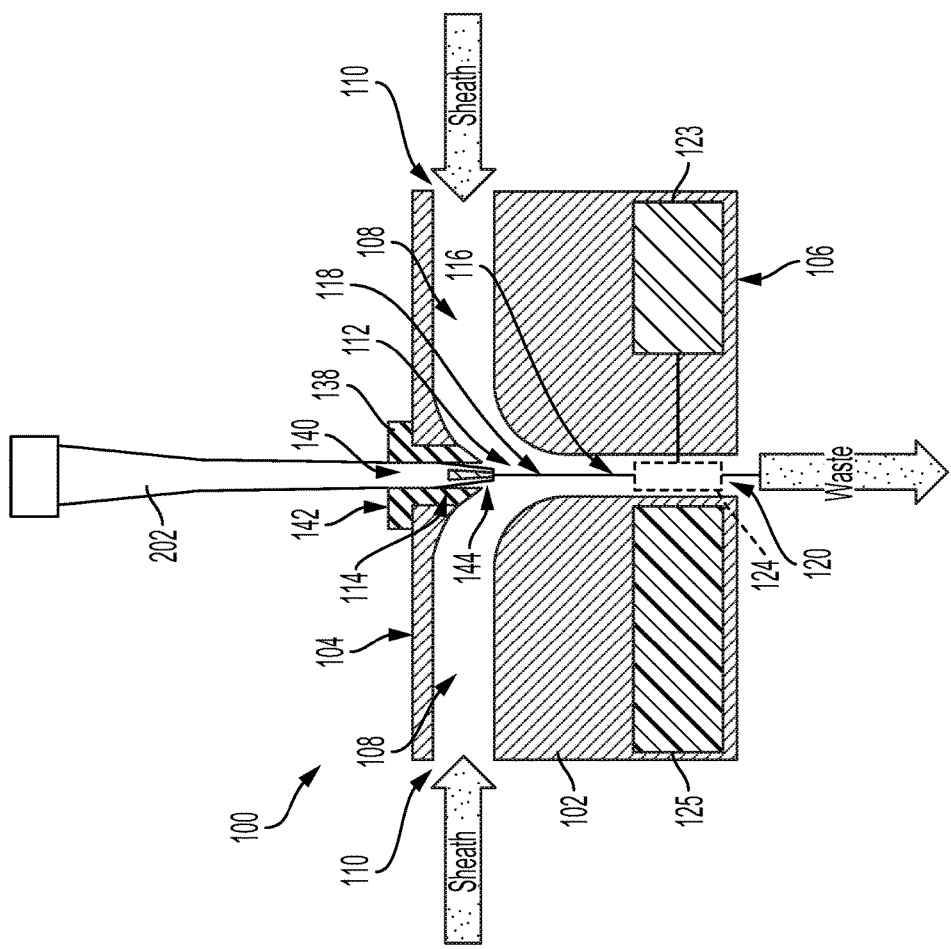
FIG. 2 is a cross-section view of an example flow cytometer module.

With reference to the Figures, FIG. 1 illustrates an example flow cytometer module 100 configured to be integrated with a liquid handling system 200. As shown in FIG. 1, the flow cytometer module 100 includes a flow cell 102 having a first end 104 and a second end 106 opposite the first end 104. The flow cytometer module 100 also includes a first fluidic pathway 108 having a first end 110 and a second end 112. The flow cytometer module 100 also includes an inlet 114 positioned at the first end 104 of the flow cell 102. The inlet 114 is configured to receive a sample introduction device 202 of the liquid handling system 200 including one or more samples from one or more sample wells 204. In one example, the first fluidic pathway 108 is circular such that a sheath flow is symmetrical around the inlet 114, as shown in FIG. 2. The flow cytometer module 100 also includes a second fluidic pathway 116 having a first end 118 and a second end 120. The first end 118 of the second fluidic pathway 116 is in fluid communication with the second end 112 of the first fluidic pathway 108, and the second end 120 of the second fluidic pathway 116 is positioned at the second end 106 of the flow cell 102. In one example, as shown in FIG. 2, a longitudinal axis of the inlet 114 is coaxial with a longitudinal axis of the second fluidic pathway 116. In another example, as shown in FIG. 2, a longitudinal axis of the first fluidic pathway 108 is perpendicular to a longitudinal axis of the second fluidic pathway 116.

The flow cytometer module 100 also includes a laser interrogation device 122 configured to examine the one or more samples at a laser interrogation point 124 in the second fluidic pathway 116. The laser interrogation device 122 may include a laser 123 and measurement optics 125. The measurement optics 125 may include forward scatter detection, side scatter detection, and various wavelengths of fluorescence detection, as non-limiting examples. In operation, the one or more samples from the liquid handling system 200 are driven past the laser, the laser 123 strikes the one or more samples at the laser interrogation point 124, and the reflected light is recorded by the measurement optics 125.

The flow cytometer module 100 also includes a controller 126 configured to be in communication with the liquid handling system 200. The controller 126 comprises non-transitory computer-readable medium having stored thereon instructions that, when executed by one or more processors, cause the flow cytometer module 100 to perform functions. The functions include recording data from the laser interrogation device 122 corresponding to a plurality of events as the one or more samples pass the laser interrogation point 124. The functions also include transmitting the data corresponding to the plurality of events to the liquid handling system 200.

The flow cytometer module 100 may also include a first pump 128 in fluid communication with the first fluidic pathway 108. The first pump 128 pushes a fluid (e.g., a combination of sheath fluid and one or more samples from the liquid handling system 200) from the first end 110 of the first fluidic pathway 108 to the second end 112 of the first fluidic pathway 108, and further from the first end 118 of the second fluidic pathway 116 to the second end 120 of the second fluidic pathway 116.

In another example, the flow cytometer module 100 may also include a second pump 130 in fluid communication with the second fluidic pathway 116. In such an example, the first pump 128 is configured to push a fluid from the first end 110 of the first fluidic pathway 108 to the second end 112 of the first fluidic pathway 108, and the second pump 130 is configured to pull the fluid from the first end 118 of the second fluidic pathway 116 to the second end 120 of the second fluidic pathway 116. In one example, the second pump 130 pulls the fluid at a greater flow rate than the first pump 128 pushes the fluid to create a vacuum in the second fluidic pathway 116. In such an example, the flow cytometer module 100 may also include a pressure sensor 132 configured to balance a flow rate between the first pump 128 and the second pump 130 to maintain the vacuum in the second fluidic pathway 116.

In one example, the fluid comprises a sheath fluid that is pumped through the flow cell 102. As the sheath fluid flow surrounds each of the one or more samples, the sheath flow hydrodynamically focuses the one or more samples into a small core, and drives the core past the laser 123 and measurement optics 125. However, because of the sheath flow, the pressure in the flow cell 102 is elevated above ambient. The sample introduction device 202 of the liquid handling system 200 may be a pipette designed to dispense into open containers which have no relative pressure. In such a scenario, the pipette may not be able to push a sample from the sample introduction device 202 into the sheath flow. Instead, the sheath flow may push up into the pipette tip and force the sample backwards. The vacuum created in the second fluidic pathway 116 by the imbalance of the flow rate of the first pump 128 and the second pump 130 may help to ensure that the one or more samples from the sample introduction device 202 of the liquid handling system 200 are introduced properly into the sheath flow in the flow cell 102.

In one particular example, the first pump 128 and/or the second pump 130 may be various conventional peristaltic pumps. In one example, the peristaltic pump(s) may be operated in a manner that reduces pulsatile flow, thereby improving the sample characteristics in the flow cytometer module 100. For example, a tubing length greater than 20 inches between the pumps 128, 130 and flow cell 102 may be used or a linear peristaltic pump may be used to improve the sample characteristics. In one example, the first fluidic pathway 108 and/or the second fluidic pathway 116 may be made of an elastomer tubing, such as nitrile (NBR), Hypalon, Viton, silicone, polyvinyl chloride ("PVC"), Ethylene-Propylene-Diene-Monomer ("EPDM"), EPDM+ polypropylene, polyurethane or natural rubber, among other possibilities. An example of such a tube may be a PVC tube having an inner diameter of about 0.5 mm to 3 mm, and a wall thickness of about 1 mm to 3 mm.

The flow cytometer module 100 may also include a sheath fluid reservoir 134 coupled to the first fluidic pathway 108. The sheath fluid reservoir 134 may be configured to hold a sheath fluid that flows through the flow cell 102 as discussed above. The flow cytometer module 100 may also include a waste reservoir 136 coupled to the second fluidic pathway 116. The waste reservoir may be configured to hold fluid waste exiting the flow cell 102, including the one or more samples that have been analyzed by the laser interrogation device 122.

Figure 3A:
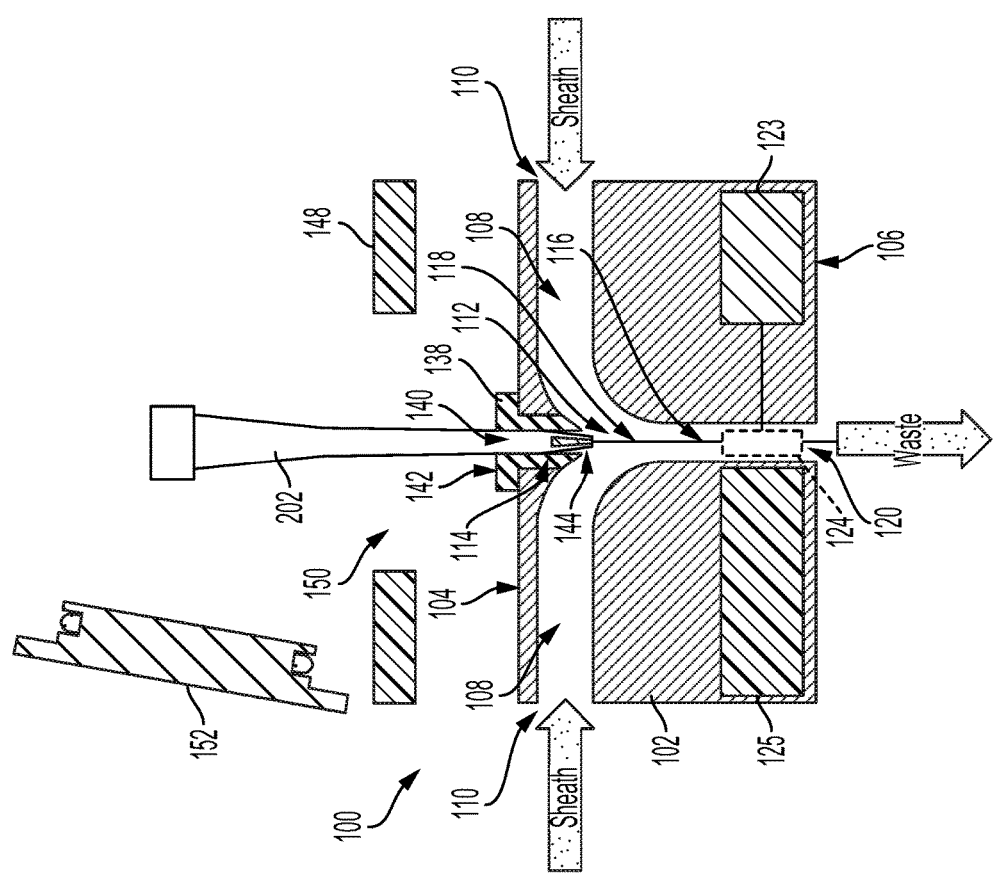
FIG. 3A is a cross-section view of another example flow cytometer module with the cover in an open position.
Figure 3B:
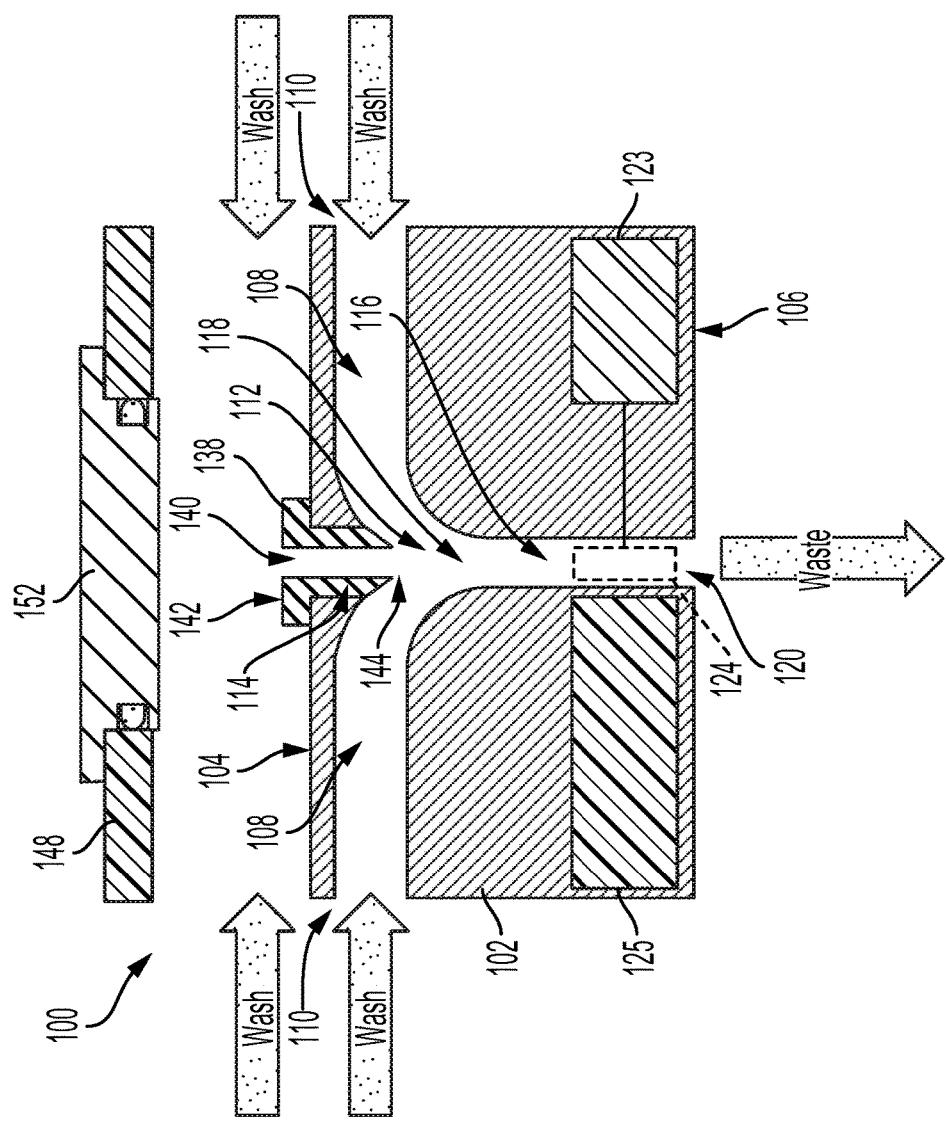
FIG. 3B is a cross-section view the example flow cytometer module of FIG. 3A with the cover in a closed position.

In one example, the flow cytometer module 100 further includes a guide 138 positioned in the inlet 114 at the first end 104 of the flow cell 102. The guide 138 includes a through-hole 140 configured to position the sample introduction device 202 of the liquid handling system 200 to align with a longitudinal axis of the second fluidic pathway 116, as shown in FIGS. 2 and 3. The guide 138 may help correct for inaccuracies in the motion and movement of the liquid handling system 200. For correct operation, the sample must be introduced at a very precise position in the sheath flow in the flow cell 102. The guide 138 forces the tip of the sample introduction device 202 into the correct position by providing a first end 142 with a first diameter, and a second end 144 with a second diameter that is less than the first diameter. In one particular example, the guide 138 includes a septum 146 including a one-way valve configured to open when the sample introduction device 202 is inserted into the guide 138. Such an example may help prevent contamination of the flow cell 102 when the flow cytometer module 100 is not in use.

Each time the sample introduction device 202 (e.g., each pipette tip) is brought to the flow cytometer module 100, the sample introduction device 202 contacts the guide 138 and may potentially contaminate the guide 138. This interaction between the sample introduction device 202 and the guide 138 could cause carryover between samples or eventual clogging of the flow cell 102. A wash feature of the flow cytometer module 100 could be implemented to address this potential issue. As shown in FIGS. 2-3, the flow cytometer module 100 may include a lid 148 coupled to the first end 104 of the flow cell 102. The lid 148 includes an opening 150 aligned with the inlet 114 of the flow cell 102. The flow cytometer module 100 may also include a cover 152 removably positioned over the opening 150 in the lid 148. FIG. 2 illustrates a simplified cross section of the lid 148 and the removal of the cover 152 while sampling from the sample introduction device 202. The cover 152 could be part of the flow cytometer module 100 that is automatically removed when the flow cytometer module 100 knows sample(s) are about to be introduced. In another example, the cover 152 could be manually removed by an operator when sampling from the sample introduction device 202. When the flow cytometer module 100 needs to wash, the lid 148 could be replaced, sealing the sample introduction area of the flow cell 102, as shown in FIG. 3. Then, wash fluids could be pumped over the first end 104 of the flow cell 102, through the first fluidic pathway 108, through the second fluidic pathway 116, and through the inlet 114 to clean the flow cell 102 and the guide 138 simultaneously. In addition, the lid 148 could be kept in the closed position shown in FIG. 3 whenever the flow cytometer module 100 is not in use to prevent airborne contaminates like dust from getting into the flow cell 102 or the guide 138.

In one example, the flow cytometer module 100 is permanently coupled to the liquid handling system 200. In another example, the flow cytometer module 100 is configured to be removably coupled to the liquid handling system 200 via one or more release mounting mechanisms 154. Such release mounting mechanisms 154 may include one or more clasps, one or more magnets, one or more hooks, and/or one or more pins, as non-limiting examples. The ability to remove the flow cytometer module 100 from the liquid handling system 200 may enable easier maintenance of the flow cytometer module 100, and may enable the flow cytometer module 100 to be added to the liquid handling system 200 after market as an add-on feature to the liquid handling system 200.

Figure 4:
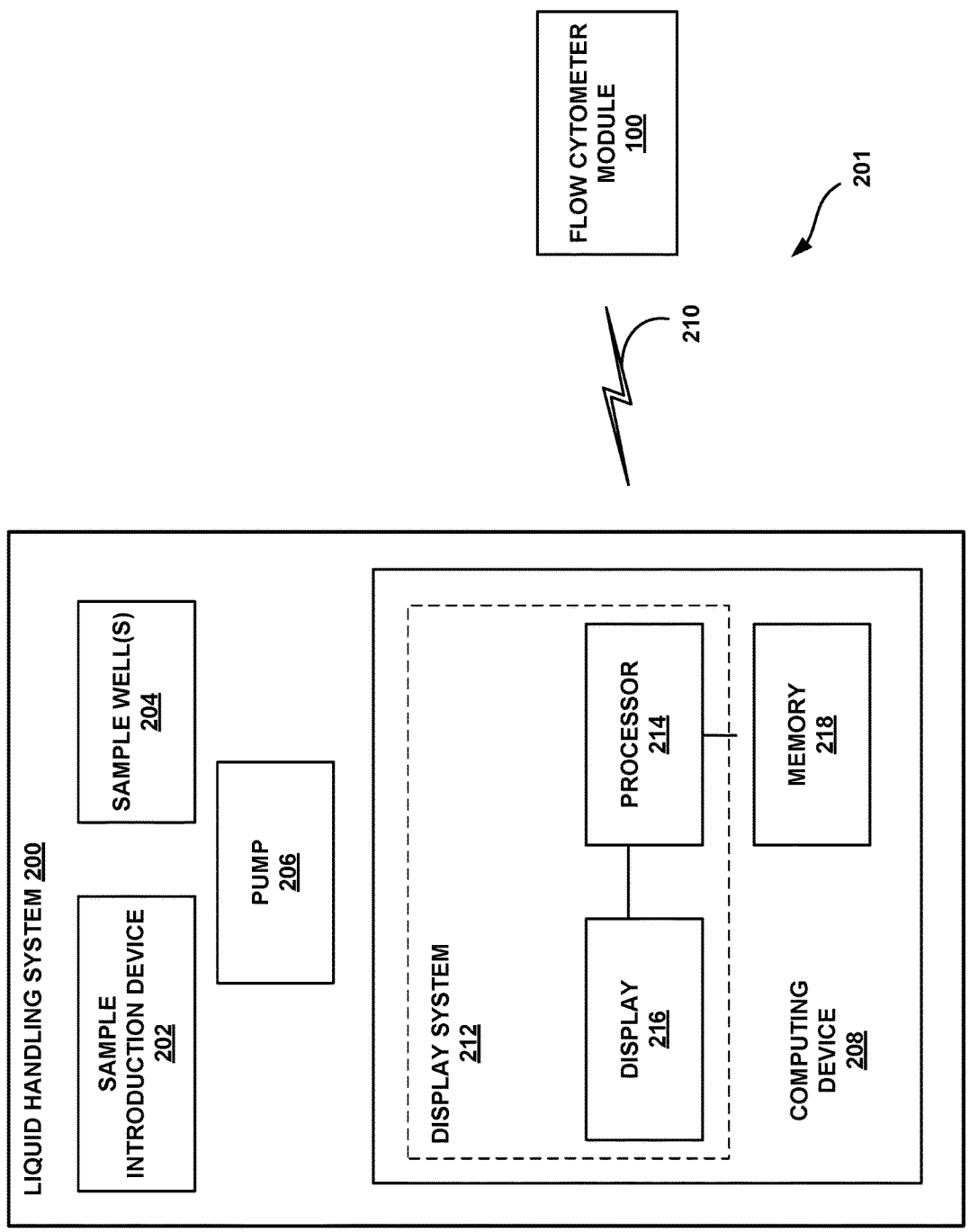
FIG. 4 is schematic drawing of an example system for transferring one or more samples from a liquid handling system to a flow cytometer module.

FIG. 4 illustrates an example system 201 for transferring one or more samples from a liquid handling system 200 to a flow cytometer module 100. As shown in FIG. 4, the system 201 includes a flow cytometer module 100 and a liquid handling system 200. The flow cytometer module 100 may include any of the features discussed above in relation to FIGS. 1-3. The liquid handling system 200 includes one or more sample wells 204, which are configured to hold one or more samples. The liquid handling system 200 also includes a sample introduction device 202 configured to receive one or more samples from the one or more sample wells 204. The flow cytometer module 100 is removably coupled to the liquid handling system 200, as discussed above. The inlet 114 of the flow cytometer module 100 is configured to receive the sample introduction device 202 to thereby transfer the one or more samples from the sample introduction device 202 to the flow cytometer module 100.

In one example, the sample introduction device 202 received by the inlet 114 of the flow cytometer module 100 comprises a pipette. In such an example, the liquid handling system 200 positions the pipette in the guide 138. The pipette is not part of the flow cytometer module 100. Instead, the pipette is controlled by the liquid handling system 200. The pipette pushes a sample into the flow cytometer module 100 using air pressure. The sheath flow in the flow cell 102 of the flow cytometer module 100 surrounds the sample, hydrodynamically focuses the sample into a small core, and drives the core past the laser 123. As discussed above, in such an example the flow cytometer module 100 may generate a vacuum in the flow cell 102 to ensure the pipette is able to push the sample into the sheath flow. The pipette may range in size from 0.5 µl to 1,000 µl, and have an exit diameter ranging from 0.1 mm to 2 mm.

In another example, the sample introduction device 202 received by the inlet 114 of the flow cytometer module 100 comprises a syringe. In such an example, the liquid handling system 200 positions the syringe in the guide 138. The syringe is not part of the flow cytometer module 100. Instead, the syringe is controlled by the liquid handling system 200. The syringe pushes a sample into the flow cytometer module 100 with sufficient force to ensure the sheath flow in the flow cell 102 of the flow cytometer module 100 surrounds the sample, hydrodynamically focuses the sample into a small core, and drives the core past the laser 123. As such, in the example where the sample introduction device 202 is a syringe, the flow cytometer module 100 may not need to generate a vacuum in the flow cell 102 to ensure the syringe is able to push the sample into the sheath flow.

The liquid handling system 200 may take a variety of forms. In one particular example, the liquid handling system 200 comprises one or more bioreactors that supports a biologically active environment. The liquid handling system 200 could be any biological cell processing or handling system which includes liquid handling and would be enhanced by including cytometric analysis.

In one example, the sample introduction device 202 includes a pump 206 to transfer the one or more samples from the sample introduction device 202 to the flow cytometer module 100. The pump 206 may be a positive displacement pump, such as a syringe pump or a peristaltic pump, as non-limiting examples. In one particular example, the pump 206 comprises a peristaltic pump that can be operated in a manner that reduces pulsatile flow, thereby improving the sample characteristics of the one or more samples in the flow cytometer module 100. In one example, at least a portion of the sample introduction device 202 may include an elastomer tubing as discussed above, such as NBR, Hypalon, Viton, silicone, PVC, EPDM, EPDM+polypropylene, polyurethane or natural rubber, among other possibilities. A particular example of such a tube may be a PVC tube having an inner diameter of about 0.01 to 0.03 inches and a wall thickness of about 0.01 to 0.03 inches. Other examples are possible as well.

As shown in FIG. 4, the liquid handling system 200 may also include a computing device that 208 communicates with the flow cytometer module 100 using a communication link 210, such as a wired or wireless connection. The computing device 208 may be any type of device that may receive data and display information corresponding to or associated with the data.

The computing device 208 may include a display system 212 that includes a processor 214 and a display 216. The display 216 may be, for example, an optical see-through display, an optical see-around display, or a video see-through display. The processor 214 may send and receive data from the flow cytometer module 100, and configure the data for display on the display 216. Depending on the desired configuration, processor 214 can be any type of processor including, but not limited to, a microprocessor, a microcontroller, a digital signal processor, or any combination thereof.

The computing device 208 may further include on-board data storage, such as memory 218 coupled to the processor 214. The memory 218 may store software that can be accessed and executed by the processor 215, for example. The memory 218 can include any type of memory now known or later developed including but not limited to volatile memory (such as RAM), non-volatile memory (such as ROM, flash memory, etc.) or any combination thereof.

According to one example, the computing device 208 may include program instructions that are stored in the memory 218 (and/or possibly in another data-storage medium) and executable by the processor 214 to facilitate the various functions described herein. Although various components of the system 201 are shown as distributed components, it should be understood that any of such components may be physically integrated and/or distributed according to the desired configuration of the computing system.

The flow cytometer module 100 and the computing device 208 may contain hardware to enable the communication link 210, such as processors, transmitters, receivers, antennas, etc.

In FIG. 4, the communication link 210 is illustrated as a wireless connection; however, wired connections may also be used. For example, the communication link 210 may be a wired link via a serial bus such as a universal serial bus or a parallel bus. A wired connection may be a proprietary connection as well. The communication link 210 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Such a communication link 210 may have a frequency band in the range of 402-405 MHz or greater than 2 GHz.

In such a system 201, the flow cytometer module 100 will be able to communicate with the liquid handling system 200, and the liquid handling system 200 will in turn be able to communicate with the flow cytometer module 100. In particular, the liquid handling system 200 may transmit data indicating one or more samples from the liquid handling system 200 are about to be introduced into the flow cytometer module 100. The flow cytometer module 100 may then accept the one or more samples, record data from the laser interrogation device corresponding to a plurality of events as the one or more samples pass the laser interrogation point, and transmit the data corresponding to the plurality of events to the liquid handling system 200. This information may then be recorded and stored by the liquid handling system 200.

The liquid handling system 200 may adjust one or more parameters of the liquid handling system 200 based on the received data corresponding to the plurality of events. As such, the liquid handling system 200 may have quality control capabilities based on the received data corresponding to the plurality of events. In one particular example, the liquid handling system 200 may monitor cells in the sample well 204, and then perform one or more actions once the cells have entered a certain state. For example, the liquid handling system 200 may wait until enough cells have entered a certain state before adding an additional reagent, moving the cells to a different sample well, or adding a drug solution to the one or more cells. Other example actions are possible as well. As another example, the liquid handling system 200 may adjust a concentration of a particular reagent in response to the received data from the flow cytometer module 100. As yet another example, the liquid handling system 200 may adjust one or more of an oxygen level in the sample well 204, a carbon dioxide level in the sample well 204, and a temperature of the sample well 204 in response to the received data from the flow cytometer module 100.

Figure 5:
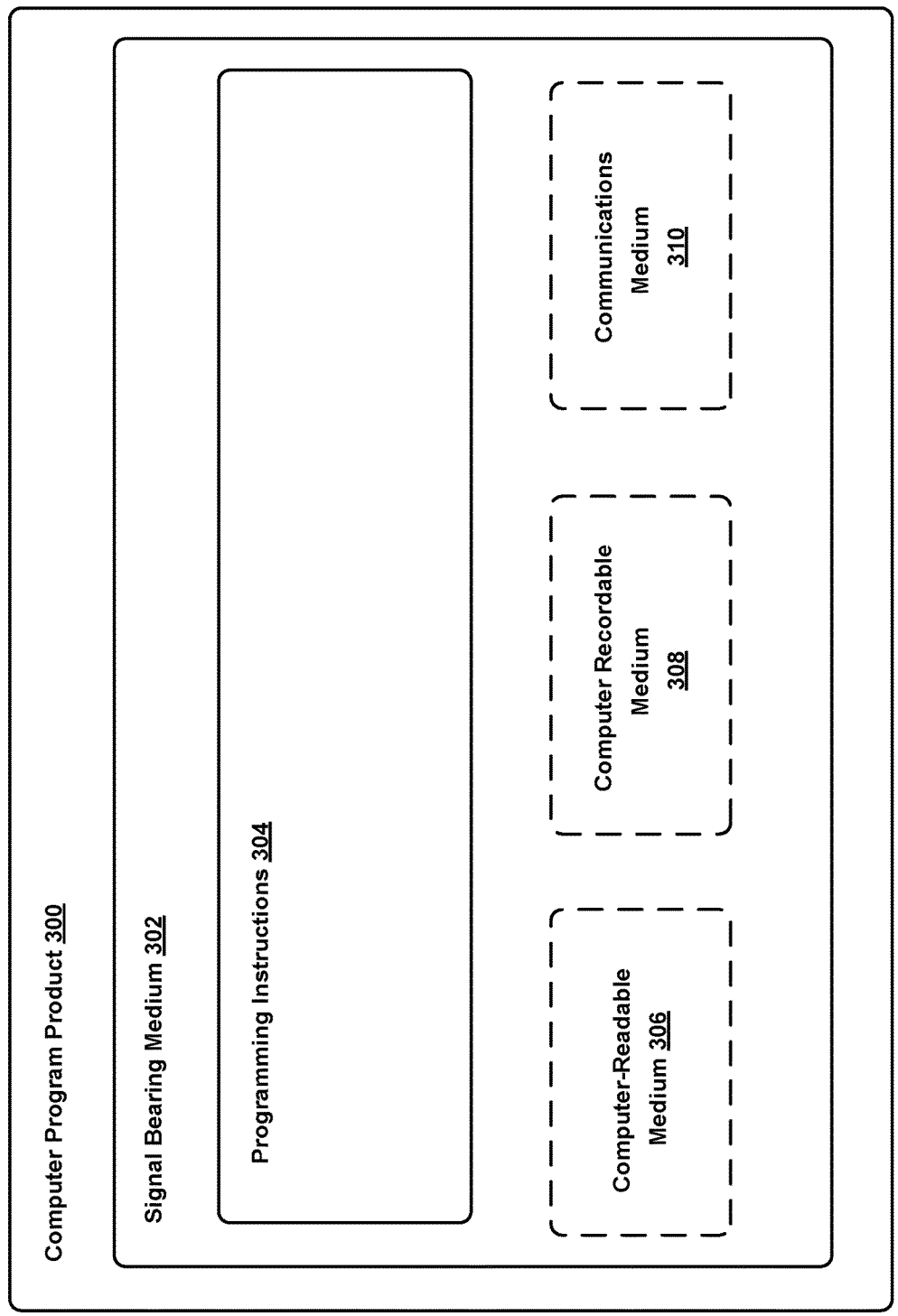
FIG. 5 is an example computer-readable medium configured according to an example implementation configured to cause the flow cytometer module of any one of FIGS. 1-4 to perform functions.

The flow cytometer module 100 described above may be controlled by a controller 126 comprising computer-readable medium. FIG. 5 depicts an example computer-readable medium configured according to an example implementation. In example implementations, an example flow cytometer module 100 may include one or more processors, one or more forms of memory, one or more input devices/interfaces, one or more output devices/interfaces, and machine readable instructions that when executed by the one or more processors cause the flow cytometer module 100 of any one of FIGS. 1-4 to perform functions, as described above.

In one implementation, the example computer program product 300 is provided using a signal bearing medium 302. The signal bearing medium 302 may include one or more programming instructions 304 that, when executed by one or more processors may cause the flow cytometer module 100 of any one of the example configurations described above in relation to FIGS. 1-4 to perform functions. In some examples, the signal bearing medium 302 may be a computer-readable medium 306, such as, but not limited to, a hard disk drive, a Compact Disc (CD), a Digital Video Disk (DVD), a digital tape, memory, etc. In some implementations, the signal bearing medium 302 may be a computer recordable medium 308, such as, but not limited to, memory, read/write (R/W) CDs, R/W DVDs, etc. In some implementations, the signal bearing medium 302 may be a communications medium 310 (e.g., a fiber optic cable, a waveguide, a wired communications link, etc.). Thus, for example, the signal bearing medium 302 may be conveyed by a wireless form of the communications medium 310.

The one or more programming instructions 304 may be, for example, computer executable and/or logic implemented instructions. In some examples, a computing device may be configured to provide various operations, functions, or actions in response to the programming instructions 304 conveyed to the computing device by one or more of the computer-readable medium 306, the computer recordable medium 308, and/or the communications medium 310.

The computer-readable medium 306 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remotely located computer system, such as a server.

An integrated flow cytometer module 100 with a liquid handling system 200 as described above in FIGS. 1-5 would eliminate the extra steps of plating samples, which must then presented to the flow cytometer by a robot or an operator. Instead, the samples can be moved directly from the source container of the liquid handling system 200 (e.g., vial, flask, tube, plate, micro bioreactor, etc.) to the flow cytometer module 100 for instant analysis. Eliminating these steps has many advantages in a lab setting.

As an initial benefit, eliminating the step of plating samples before analysing the samples with a flow cytometer saves time. Plating slows down the processing of samples and can effect time-sensitive samples. While plating samples is a standard technique, it can have potentially adverse effects on the samples. Potential problems include undesirable interaction between the sample and the plate (e.g. adherence), pipetting mistakes, small volumes are difficult to plate, evaporation while in the plate, contamination from the plate, and contamination while the samples are exposed to air. The described integrated flow cytometer module 100 with a liquid handling system 200 eliminates these potential issues. In addition, with the flow cytometer module closely integrated to the liquid handling system 200, less lab space is used and an expensive, complex robot is not required.

Another potential benefit is that a flow cytometer module 100 is easier for us to create and maintain compared to a stand-alone unit. The flow cytometer module 100 does not need its own sample handling apparatus. The flow cytometer module 100 would work with all types of plates, all types of vials, or any container from which samples can be pipetted.

Another potential benefit is that the flow cytometer module 100 would have little to no carryover. If a separate pipette tip is used for each sample (a common procedure in liquid handlers), there would be no carryover. In addition, the flow cytometer module 100 can easily be designed to wash the sample introduction area between each sample (as discussed above in relation to FIGS. 2-3).

Yet another potential benefit is that the flow cytometer module 100 would not require software analysis to separate the samples into individual wells. Such an analysis would not be necessary in the integrated system because the timing of when each sample is introduced from the liquid handling system 200 to the flow cytometer module 100 would be known exactly.

In use, the flow cytometer module 100 would be capable of operating in a variety of high-throughput modes. In a first mode of operation using a single pipette as the sample introduction device 202, the liquid handling system 200 would move the pipette rapidly between samples and the flow cytometer module 100. To save time, the same pipette tip could re-used instead of replacing it in between samples. However, reusing a tip may cause carryover between samples. The first mode of operation would work as follows:

1. Sheath and waste flows are started in the flow cytometer module 100.
2. The liquid handling system 200 aspirates a sample from a container of the liquid handling system 200. The sample might be 1 µl.
3. The software on the liquid handling system 200 notifies the flow cytometer module 100 that a sample is imminent.
4. The flow cytometer module 100 turns on the laser 123.
5. The liquid handling system 200 positions the pipette tip in the guide 138 of the flow cytometer module 100.
6. The pipette of the liquid handling system 200 ejects the sample from the pipette at a controlled rate.
7. The flow cytometer module 100 records the events as the samples pass the laser 123.
8. The liquid handling system 200 removes the pipette from the guide 138.
9. The flow cytometer module 100 stops recording and turns off the sheath and waste flows.
10. The flow cytometer module 100 passes the data on the events to a database of the liquid handling system 200.

Some liquid handling systems have multiple pipettes which can aspirate and dispense independently of each other but they are on the same gantry so they cannot move across the work area independently. Thus, in a second mode of operation to achieve high throughput sampling with these systems, the liquid handling system 200 could simultaneously aspirate with all pipettes from a row or column of a micro plate, move the pipettes to the flow cytometer module 100, and then rapidly supply the samples in serial fashion to the flow cytometer module 100. This would significantly increase the sampling rate compared to the previous method because movement over the work area is reduced and the aspiration is done in parallel. In particular, the second mode of operation would work as follows:

1. Sheath and waste flows are started in the flow cytometer module 100.
2. The liquid handling system 200 aspirates multiple samples from containers into separate pipettes. The samples might be 1 µl, in one particular example. Other sample sizes are possible as well.
3. The software on the liquid handling system 200 notifies the flow cytometer module 100 that a number of samples is imminent.
4. The flow cytometer module 100 module turns on the laser.
5. The liquid handling system 200 positions a pipette tip in the guide 138 of the flow cytometer module 100.
6. The liquid handling system 200 informs the flow cytometer module 100 about which sample is coming.
7. The pipette of the liquid handling system 200 ejects the sample from the pipette at a controlled rate.
8. The flow cytometer module 100 records the events as the samples pass the laser 123.
9. The liquid handling system 200 removes the pipette from the guide 138.
10. The liquid handling system 200 informs the flow cytometer module 100 that the sample is complete.
11. Steps 5 through 10 are repeated until all the samples have been recorded.
12. The flow cytometer module 100 stops recording and turns off the sheath and waste flows.
13. The flow cytometer module 100 parses the data into the separate samples.
14. The flow cytometer module 100 passes the data on the events to the database of the liquid handling system 200.

In a third mode of operation, the highest throughput would be achieved using two or more independent pipettes. In the third mode, the pipettes would be able to move across the work area completely independently. While one pipette is delivering the sample to the flow cytometer module 100, another is aspirating the next sample. To eliminate carryover, other pipettes could be disposed of or their tips replaced between aspirating samples. Table 1 below illustrates a possible workflow where the pipettes are moving a continuous "chain" of samples to the cytometer according to the third mode of operation:

TABLE 1

| Time Step | Pipette #1 | Pipette #2 | Pipette #3 | Pipette #4 |
|---|---|---|---|---|
| 1 | Aspirate Sample #1 | | | |
| 2 | Supply Sample #1 to Cytometer | Aspirate Sample #2 | | |
| 3 | Dispose of tip | Supply Sample #2 to Cytometer | Aspirate Sample #3 | |
| 4 | Get replacement tip | Dispose of tip | Supply Sample #3 to Cytometer | Aspirate Sample #4 |
| 5 | Aspirate sample #5 | Get replacement tip | Dispose of tip | Supply Sample #4 to Cytometer |
| 6 | Continue . . . | Aspirate sample #6 | Get replacement tip | Dispose of tip |
| 7 | | Continue . . . | Aspirate sample #7 | Get replacement tip |
| 8 | | | Continue . . . | Aspirate sample #8 |

FIG. 6 is a block diagram of an example method operable by a flow cytometer module. Method 400 shown in FIG. 6 presents an example of a method that could be carried out by the flow cytometer module 100 described above in relation to FIGS. 1-5, as an example. Method 400 includes one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present examples. In this regard, the method 400 can be caused to be performed by program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

Initially, at block 402, the method 400 includes removably coupling a flow cytometer module 100 to a liquid handling system 200. As discussed above, the flow cytometer module 100 is configured to be removably coupled to the liquid handling system 200 via one or more release mounting mechanisms 154. The flow cytometer module 100 may include any of the features described above in relation to FIGS. 1-5, and the liquid handling system 200 may include any of the features described above in relation to FIGS. 1 and 4. At block 404, the method 400 includes providing a fluid flow from the first end 110 of the first fluidic pathway 108 to the second end 112 of the first fluidic pathway 108, and from the first end 118 of the second fluidic pathway 116 to the second end 120 of the second fluidic pathway 116. As discussed above, the fluid of the fluid flow may comprise a sheath fluid. At block 406, the method 400 includes receiving, through the inlet 114 of the flow cytometer module 100 via a sample introduction device 202 of the liquid handling system 200, one or more samples into the fluid flow at the first end 118 of the second fluidic pathway 116. At block 408, the method 400 includes recording, via the controller 126 of the flow cytometer module 100, data from the laser interrogation device 122 corresponding to a plurality of events as the one or more samples pass a laser interrogation point 124. At block 410, the method 400 includes transmitting, via the controller 126, the data corresponding to the plurality of events to the liquid handling system 200.

In one example, the sample introduction device comprises a first sample introduction device, and wherein the one or more samples comprises a first one or more samples. In such an example, the method 400 may further include (i) receiving, through the inlet 114 of the flow cytometer module 100 via a second sample introduction device of the liquid handling system 200, one or more second samples into the fluid flow at the first end 118 of the second fluidic pathway 116, (ii) recording, via the controller 126, data from the laser interrogation device 122 corresponding to a second plurality of events as the second one or more samples pass the laser interrogation point 124, and (iii) transmitting, via the controller 126, the data corresponding to the second plurality of events to the liquid handling system 200.

In another example, as discussed above, the flow cytometer module 100 includes a first pump 128 in fluid communication with the first fluidic pathway 108. In such an example, the step of providing the fluid flow comprises the first pump pushing a fluid from the first end 110 of the first fluidic pathway 108 to the second end 120 of the second fluidic pathway 116. In another example, as discussed above, the flow cytometer module 100 includes a second pump 130 in fluid communication with the second fluidic pathway 116. In such an example, the step of providing the fluid flow further comprises the second pump 130 pulling the fluid from the first end 118 of the second fluidic pathway 116 to the second end 120 of the second fluidic pathway 116. In such an example, the second pump 130 may pull the fluid at a greater flow rate than the first pump 128 pushes the fluid to create a vacuum in the second fluidic pathway 116.

In another example, the flow cytometer module 100 further comprises a lid 148 coupled to the first end 104 of the flow cell 102 and including an opening 150 aligned with the inlet 114 of the flow cell 102, and a cover 152 removably positioned over the opening 150 in the lid 148. In such an example, the method 400 may further include (i) receiving, via the controller 126, an indication from the liquid handling system 200 that the sample introduction device 202 is approaching the inlet 114, and (ii) in response to the indication, the controller 126 opening the cover 152 of the lid 148 to expose the inlet 114 via the opening 150 in the lid 148. In another example, the cover 152 of the lid 148 may be opened manually be an operator to expose the inlet 114 via the opening 150 in the lid 148. In another example, the method 400 may further include the sample introduction device 202 contacting the cover 152 of the lid 148 to thereby expose the inlet 114 via the opening 150 in the lid 148. In yet another example, the method 400 may further include, while the cover 152 is positioned over the opening 150 in the lid 148, providing a wash fluid over a top surface of the flow cell 102, through the inlet 114, through the first fluidic pathway 108, through the second fluidic pathway 116, and exiting the flow cell 102.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

The invention claimed is:

1. A system for transferring one or more samples from a liquid handling system to a flow cytometer module, the system comprising:
   the flow cytometer module comprising:
      a flow cell having a first end and a second end opposite the first end;
      a first fluidic pathway positioned within the flow cell, wherein the first fluidic pathway includes a first end and a second end;
      a second fluidic pathway positioned within the flow cell, wherein the second fluidic pathway includes a first end and a second end, wherein the first end of the second fluidic pathway is in fluid communication with the second end of the first fluidic pathway, wherein the second end of the second fluidic pathway is positioned at the second end of the flow cell;
      an inlet positioned at the first end of the flow cell, wherein the inlet is further positioned at the second end of the first fluidic pathway and at the first end of the second fluidic pathway;
      a laser interrogation device configured to examine the one or more samples at a laser interrogation point in the second fluidic pathway; and
      a controller configured to be in communication with the liquid handling system, wherein the controller comprises non-transitory computer-readable medium having stored thereon instructions that, when executed by one or more processors, cause the flow cytometer module to perform functions comprising:
         recording data from the laser interrogation device corresponding to a plurality of events as the one or more samples pass the laser interrogation point; and
         transmitting the data corresponding to the plurality of events to the liquid handling system; and
   the liquid handling system comprising:
      one or more sample wells; and
      a sample introduction device moveable from a first position in which the sample introduction device receives the one or more samples from the one or more sample wells to a second position in which the sample introduction device is positioned at least partially in the inlet of the flow cytometer module, wherein the sample introduction device transfers the one or more samples from the sample introduction device to the flow cytometer module in the second position.

2. The system of claim 1, further comprising:
   a first pump in fluid communication with the first fluidic pathway.

3. The system of claim 2, further comprising:
   a second pump in fluid communication with the second fluidic pathway.

4. The system of claim 3, wherein the first pump is configured to push a fluid from the first end of the first fluidic pathway to the second end of the first fluidic pathway, and wherein the second pump is configured to pull the fluid from the first end of the second fluidic pathway to the second end of the second fluidic pathway.

5. The system of claim 4, wherein the second pump pulls the fluid at a greater flow rate than the first pump pushes the fluid to create a vacuum in the second fluidic pathway.

6. The system of claim 3, further comprising a pressure sensor configured to balance a flow rate between the first pump and the second pump to maintain a vacuum in the second fluidic pathway.

7. The system of claim 1, further comprising a guide positioned in the inlet at the first end of the flow cell, wherein the guide comprises a through-hole configured to position the sample introduction device to align with a longitudinal axis of the second fluidic pathway.

8. The system of claim 7, wherein the guide comprises a septum including a one-way valve configured to open only when the sample introduction device is in the second position.

9. The system of claim 1, wherein a longitudinal axis of the inlet is coaxial with a longitudinal axis of the second fluidic pathway.

10. The system of claim 1, wherein a longitudinal axis of the first fluidic pathway is perpendicular to a longitudinal axis of the second fluidic pathway.

11. The system of claim 1, further comprising a sheath fluid reservoir coupled to the first fluidic pathway, wherein the sheath fluid reservoir is configured to hold a sheath fluid.

12. The system of claim 1, further comprising a waste reservoir coupled to the second fluidic pathway, wherein the waste reservoir is configured to hold fluid waste exiting the flow cell.

13. The system of claim 1, further comprising:
a lid coupled to the first end of the flow cell, wherein the lid includes an opening aligned with the inlet of the flow cell; and
a cover removably positioned over the opening in the lid.

14. The system of claim 1, wherein the sample introduction device received by the inlet comprises a pipette.

15. The system of claim 1, wherein the sample introduction device received by the inlet comprises a syringe.

16. The system of claim 1, wherein the liquid handling system comprises one or more bioreactors.

17. The system of claim 1, wherein the sample introduction device includes a peristaltic pump to transfer the one or more samples from the sample introduction device to the flow cytometer module.

18. A method comprising:
removably coupling the flow cytometer module of claim 1 to the liquid handling system of claim 1;
providing a fluid flow from the first end of the first fluidic pathway to the second end of the first fluidic pathway, and from the first end of the second fluidic pathway to the second end of the second fluidic pathway;
receiving, through the inlet of the flow cytometer module via the sample introduction device of the liquid handling system, one or more samples into the fluid flow at the first end of the second fluidic pathway;
recording, via the controller, data from the laser interrogation device corresponding to a plurality of events as the one or more samples pass a laser interrogation point; and
transmitting, via the controller, the data corresponding to the plurality of events to the liquid handling system.

19. The method of claim 18, wherein the sample introduction device comprises a first sample introduction device, and wherein the one or more samples comprises a first one or more samples, the method further comprising:
receiving, through the inlet of the flow cytometer module via a second sample introduction device of the liquid handling system, one or more second samples into the fluid flow at the first end of the second fluidic pathway;
recording, via the controller, data from the laser interrogation device corresponding to a second plurality of events as the second one or more samples pass the laser interrogation point; and
transmitting, via the controller, the data corresponding to the second plurality of events to the liquid handling system.

20. The method claim 18, wherein the flow cytometer module includes a first pump in fluid communication with the first fluidic pathway, wherein providing the fluid flow comprises:
the first pump pushing a fluid from the first end of the first fluidic pathway to the second end of the second fluidic pathway.

21. The method of claim 20, wherein the flow cytometer module includes a second pump in fluid communication with the second fluidic pathway, wherein providing the fluid flow further comprises:
the second pump pulling the fluid from the first end of the second fluidic pathway to the second end of the second fluidic pathway.

22. The method of claim 21, wherein the second pump pulls the fluid at a greater flow rate than the first pump pushes the fluid to create a vacuum in the second fluidic pathway.

23. The method of claim 18, wherein the flow cytometer module further comprises a lid coupled to the first end of the flow cell and including an opening aligned with the inlet of the flow cell, and a cover removably positioned over the opening in the lid, the method further comprising:
receiving, via the controller, an indication from the liquid handling system that the sample introduction device is approaching the inlet; and
in response to the indication, the controller opening the cover of the lid to expose the inlet via the opening in the lid.

24. The method of claim 18, wherein the flow cytometer module further comprises a lid coupled to the first end of the flow cell and including an opening aligned with the inlet of the flow cell, and a cover removably positioned over the opening in the lid, the method further comprising:
the sample introduction device contacting the cover of the lid to thereby expose the inlet via the opening in the lid.

25. The method of claim 18, wherein the flow cytometer module further comprises a lid coupled to the first end of the flow cell and including an opening aligned with the inlet of the flow cell, and a cover removably positioned over the opening in the lid, the method further comprising:
while the cover is positioned over the opening in the lid, providing a wash fluid over a top surface of the flow cell, through the inlet, through the first fluidic pathway, through the second fluidic pathway, and exiting the flow cell.

26. The system of claim 1, wherein the flow cytometer module is configured to be removably coupled to the liquid handling system via one or more release mounting mechanisms.

* * * * *